(12) United States Patent
Kaji et al.

(10) Patent No.: US 7,688,027 B2
(45) Date of Patent: Mar. 30, 2010

(54) PORTABLE BATTERY CHARGER TO CHARGE PLURAL BATTERIES

(75) Inventors: Eiji Kaji, Kanagawa (JP); Hideki Kikuchi, Kanagawa (JP); Masayuki Enari, Kanagawa (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 11/787,747

(22) Filed: Apr. 17, 2007

(65) Prior Publication Data

US 2007/0247111 A1    Oct. 25, 2007

(30) Foreign Application Priority Data

Apr. 19, 2006    (JP)    ............................ P2006-115662

(51) Int. Cl.
*H01M 10/46* (2006.01)
(52) U.S. Cl. ...................................................... 320/112
(58) Field of Classification Search ................ 320/107, 320/112, 116, 150; 429/96, 97, 98, 99, 100
See application file for complete search history.

(56) References Cited

U.S. PATENT DOCUMENTS

2004/0095093 A1*  5/2004  Baba et al. .................. 320/112

2008/0164081 A1*  7/2008  Watanabe et al. .......... 180/65.2

FOREIGN PATENT DOCUMENTS

JP          2594139          12/1996
JP        2005 176461         6/2005

* cited by examiner

*Primary Examiner*—Edward Tso
(74) *Attorney, Agent, or Firm*—Frommer Lawrence & Haug LLP; William S. Frommer; Ellen Marcie Emas (57) ABSTRACT

A charger configured to charge batteries includes a housing including a plurality of battery storage chambers accommodating the batteries, the battery storage chambers being aligned in a horizontal direction such that depth directions of the battery storage chambers are parallel to each other; openings formed on first ends of the battery chambers in the depth direction, the batteries being attached to and detached from the battery storage chambers through the openings; and charger-side terminals provided on the battery storage chambers, the charger-side terminals being connect to and disconnect from battery-side terminals of the batteries stored in the battery storage chambers.

14 Claims, 9 Drawing Sheets

PORTABLE BATTERY CHARGER TO CHARGE PLURAL BATTERIES

CROSS REFERENCES TO RELATED APPLICATIONS

The present invention contains subject matter related to Japanese Patent Application JP 2006-115662 filed in the Japanese Patent Office on Apr. 19, 2006, the entire contents of which are incorporated herein by reference.

BACKGROUND OF THE INVENTION

1. Field of the Invention

The present invention relates to a battery charger.

2. Description of the Related Art

Broadcasting equipment used at broadcasting stations includes, for example, video cameras, video tape recorders (VTRs), and audio transmitters.

Some types of broadcasting equipment are driven by batteries so that they can be used when electrical outlets are not available, such as outdoors or while traveling.

Power consumption of many of such types of broadcasting equipment is great compared with other commercial equipment, and a battery having an electrical power of about 60 to 90 w is required. Therefore, the battery has a great size of, for example, a height of 6 cm, a width of 10 cm, a depth (length) of 17 cm.

When using battery-driven broadcasting equipment, the driving time of one battery is limited. Therefore, in many cases, several charged batteries are prepared, and each of these batteries is used in order.

The battery charger for charging a battery includes a case to be mounted on a desk or a shelf, a battery attachment portion formed with an upward opening in the upper surface of the case for attaching the battery from the above, a charger-side terminal provided on the battery attachment portion, a charger control circuit that is provided inside the case, and a power cable that is connected to a electrical outlet and supplies electrical power to the charger control circuit (refer to Japanese Patent No. 2594139).

SUMMARY OF THE INVENTION

However, to charge a plurality of batteries in a small space outdoors or while traveling, such as at a hotel room or in an outdoor broadcasting van, a plurality of known chargers have to be disposed two-dimensionally on a desk or floor because known battery chargers are structured in a manner such that batteries are attached to the battery attachment portions from above the case.

Therefore, the cases and the power cables of the battery chargers occupy a large space. In addition, since the power cables have to be drawn to the electrical outlets, it is difficult to line up the battery chargers, and the orientations and positions of the battery chargers cannot be aligned. Thus, as the number of required batteries increase, the operation of attaching and detaching the batteries to and from the battery chargers becomes more complicated and inefficient.

The present invention has been conceived in light of the problems described above. Accordingly, a charger according to an embodiment of the present invention to an embodiment of the present invention is capable of charging many batteries in a small space and enables efficient attaching and detaching operation of many batteries.

A charger according to an embodiment of the present invention is configured to charge batteries and includes a housing including a plurality of battery storage chambers accommodating the batteries, the battery storage chambers being aligned in a horizontal direction such that depth directions of the battery storage chambers are parallel to each other; openings formed on first ends of the battery chambers in the depth direction, the batteries being attached to and detached from the battery storage chambers through the openings; and charger-side terminals provided on the battery storage chambers, the charger-side terminals being connect to and disconnect from battery-side terminals of the batteries stored in the battery storage chambers.

With the charger according to an embodiment of the present invention, a plurality of batteries can be attached to and detached from the battery storage chambers in the horizontal direction and can be stored in the battery storage chambers. Therefore, many batteries can be aligned in a small space and charged. In this way, the ease-of-operation of attaching and detaching many batteries can be improved.

DESCRIPTION OF THE PREFERRED EMBODIMENTS

Embodiments of the present invention will be described below with reference to the drawings.

First Embodiment

First, before describing an attaching and detaching mechanism that is the main element of the embodiments of the present invention, the structure of a charger according to an embodiment of the present invention will be described.

Figure 1A:
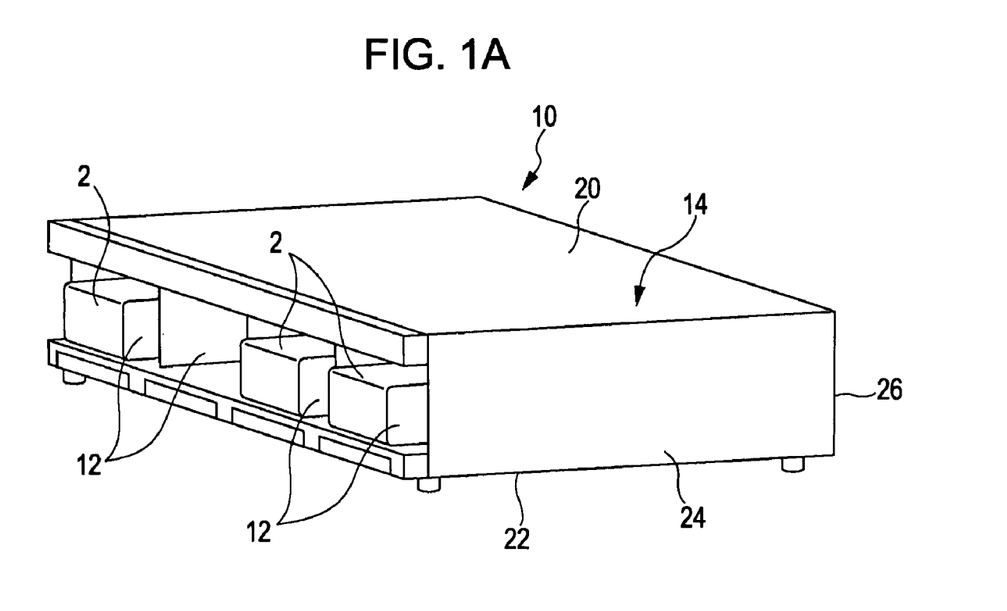
FIGS. 1A and 1B are perspective views illustrating batteries attached on a charger according to an embodiment of the present invention.
Figure 1B:
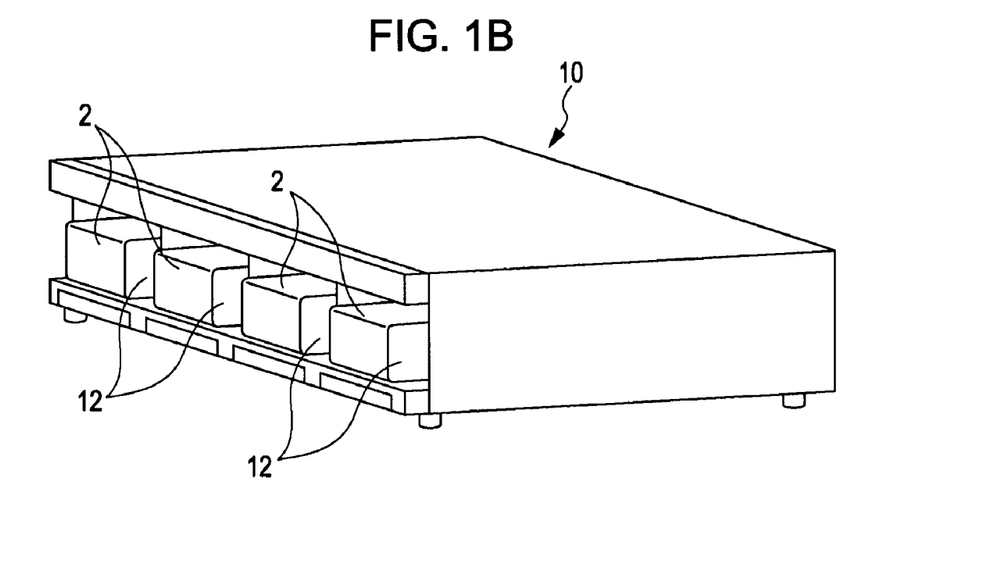

FIGS. 1A and 1B are perspective views illustrating batteries attached on a charger according to an embodiment of the present invention.

Figure 2:
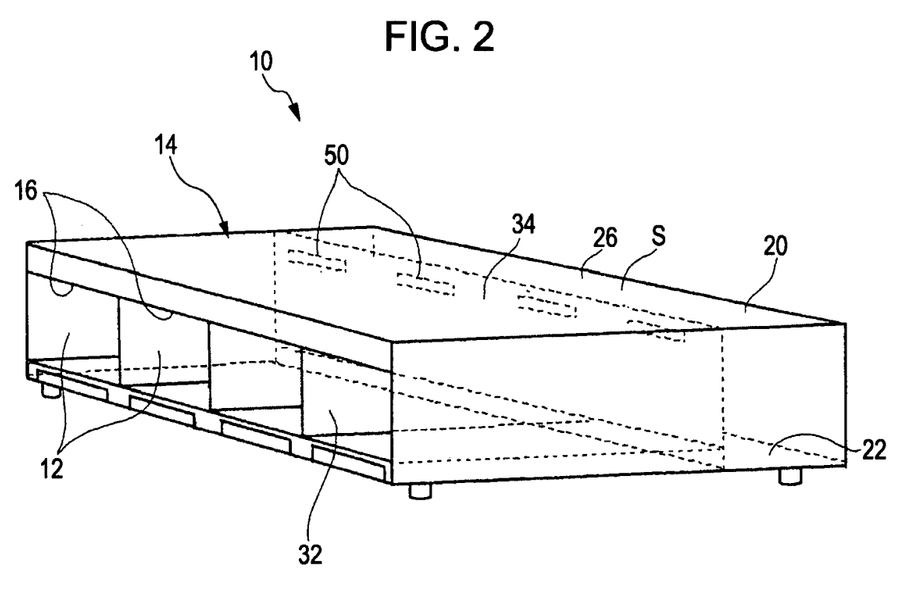
FIG. 2 is a perspective view illustrating the structure of the charger.
Figure 3:
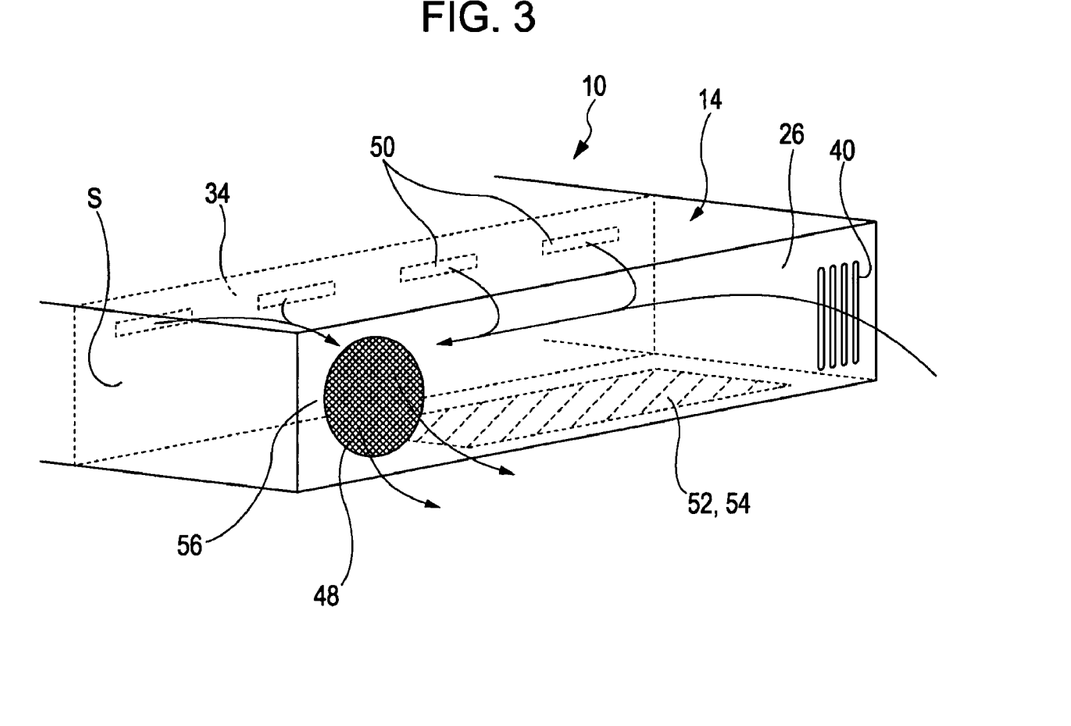
FIG. 3 illustrates the airflow in the charger.

FIG. 2 is a perspective view illustrating the structure of a charger 10. FIG. 3 illustrates the airflow in the charger 10.

Figure 4:
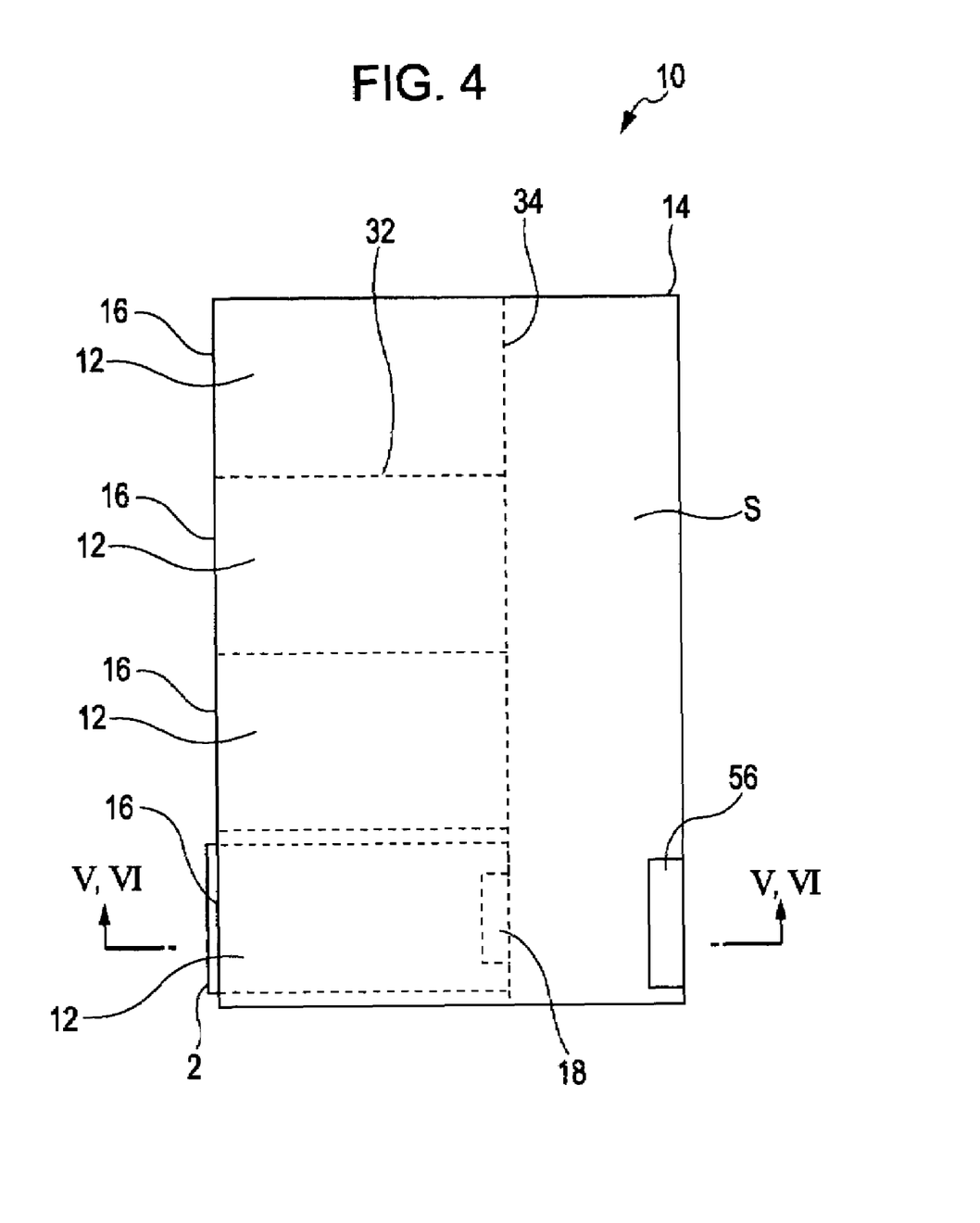
FIG. 4 is a plan view illustrating the charger.

FIG. 4 is a plan view of the charger 10.

Figure 5:
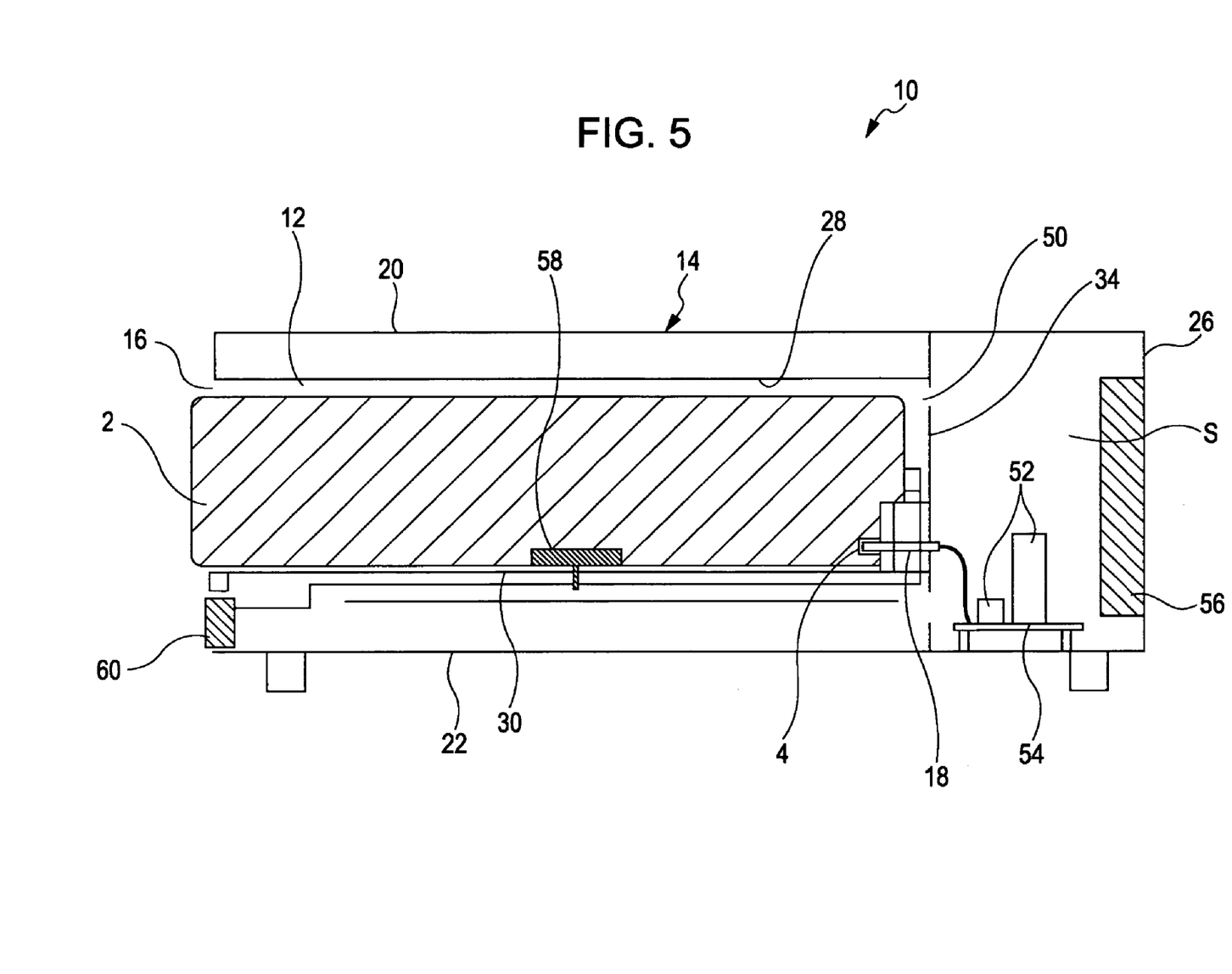
FIG. 5 is a cross-sectional view taken along line V-V in FIG. 4 and illustrates an attached state of a battery.
Figure 6:
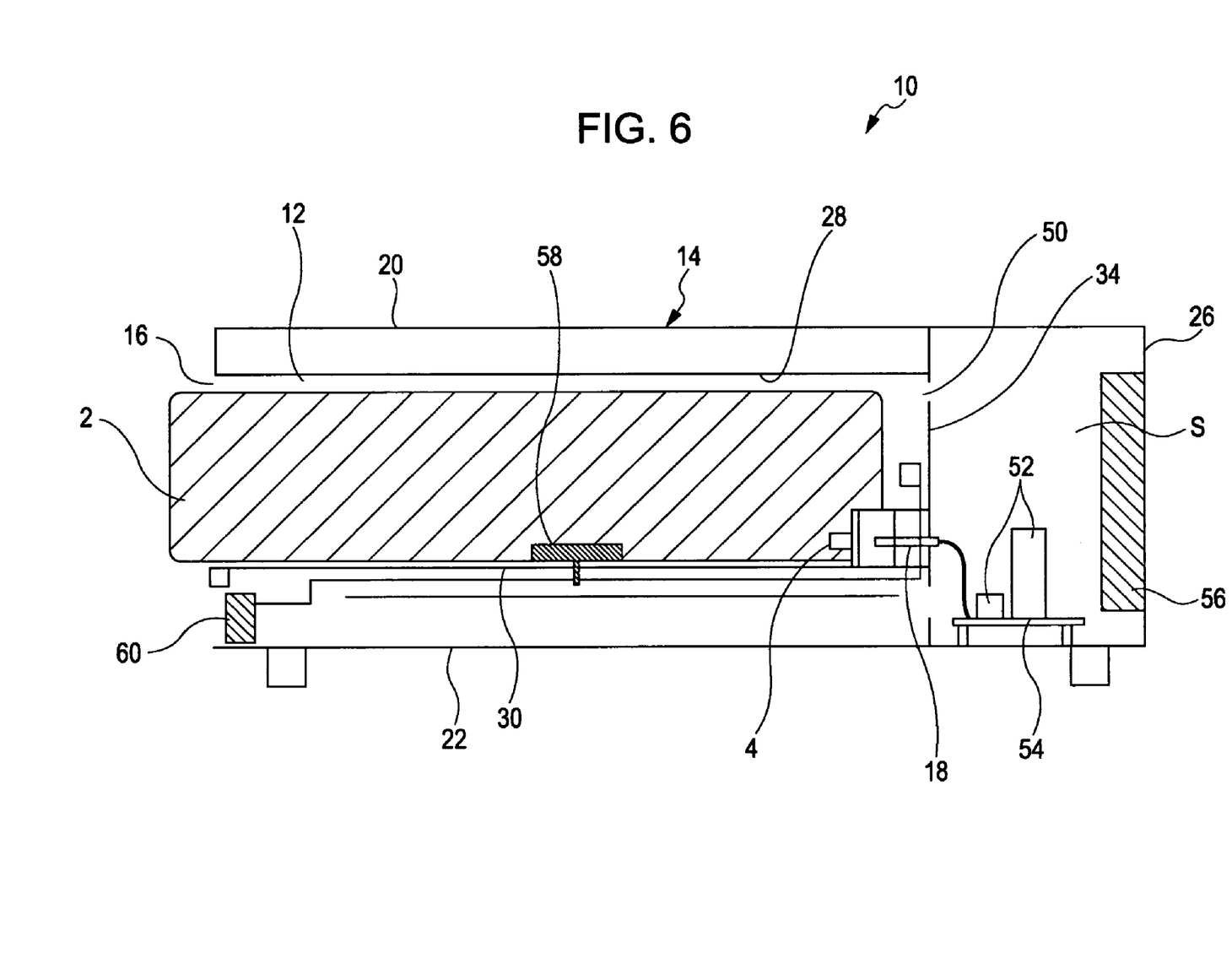
FIG. 6 is a cross-sectional view taken along line VI-VI in FIG. 4 and illustrates a disconnected state of a battery-side terminal and a charger-side terminal.

FIG. 5 is a cross-sectional view taken along line V-V in FIG. 4 and illustrates an attached state of a battery 2. FIG. 6 is a cross-sectional view taken along line VI-VI in FIG. 4 and illustrates a disconnected state of a battery-side terminal 4 and a charger-side terminal 18.

Figure 7:
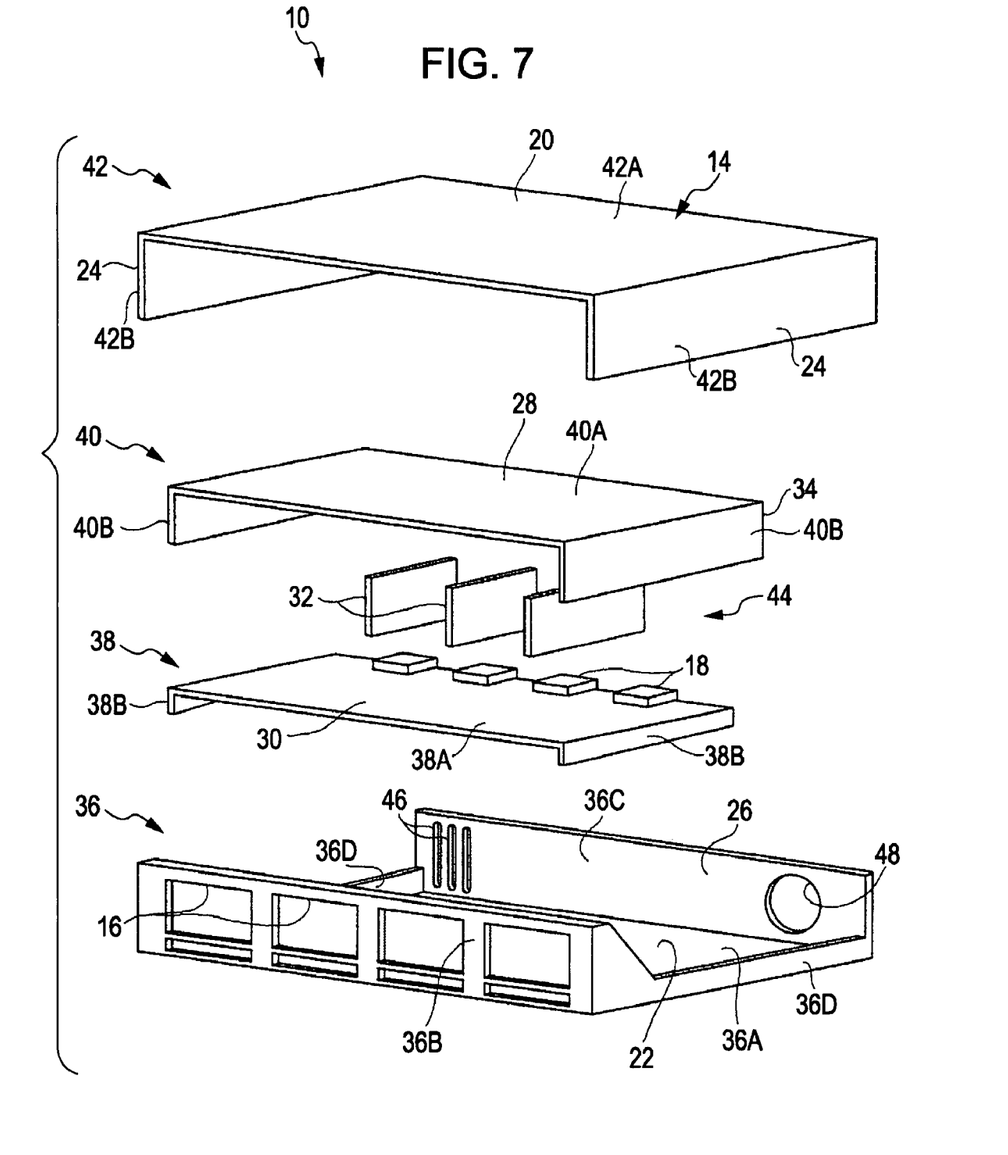
FIG. 7 is an exploded perspective view of a housing.
Figure 8:
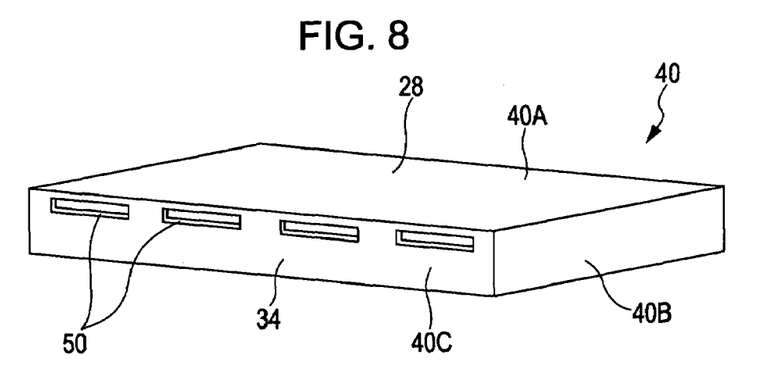
FIG. 8 is a perspective view from the backside of a second intermediate member.

FIG. 7 is an exploded perspective view of a housing 14. FIG. 8 is a perspective view from the backside of a second intermediate member 40.

As shown in FIGS. 1A, 1B, 5, and 6, the battery 2 is formed as a block whose width and height are each greater than its depth (length) and having a rectangular cross-section. The battery-side terminal 4 is provided on a first end of the battery 2 in the depth direction. The battery 2 is used for broadcasting equipment and, for example, has a large capacity capable of outputting electrical power of about 60 to 90 W. The battery 2 has a great size of, for example, a height of 6 cm, a width of 10 cm, a depth (length) of 17 cm.

The charger 10 charges a plurality of batteries 2 and includes the housing 14 including a plurality of battery storage chambers 12 that accommodate the batteries 2. According to this embodiment, four battery storage chambers 12 are provided. In FIG. 1A, three batteries 2 are stored in three of the four battery storage chambers 12. In FIG. 1B, batteries 2 are stored in all four of the battery storage chambers 12.

As shown in FIG. 2, each of the battery storage chambers 12 has width and height that are greater than the width and height, respectively, of each of the batteries 2. The battery storage chambers 12 are provided in the horizontal direction so that their sides in the depth direction (extending direction) extend parallel to each other.

As shown in FIGS. 2 and 5, at a second end of each battery storage chamber 12 in the depth direction, an opening 16 for attaching and detaching the battery 2 in the depth direction (length direction) of the battery storage chamber 12 is provided.

As shown in FIGS. 5 and 6, at a first end of the battery storage chamber 12 in the depth direction, the charger-side terminal 18 that can be connected to or disconnected from the battery-side terminal 4 of the battery 2 stored in the battery storage chamber 12 is provided.

As shown in FIG. 5, the battery storage chambers 12 are aligned in the horizontal direction so that the depth direction of the battery storage chambers 12 matches the horizontal direction. As shown in FIG. 2, the plurality of openings 16 is provided along a straight line in plan view of the housing 14.

As shown in FIG. 4, the housing 14 is a rectangle in plan view, and the openings 16 are aligned along one of the longer sides of the rectangle.

As shown in FIGS. 1A and 7, the housing 14 includes an upper plate 20 and a bottom plate 22 that are parallel to each other, left and right side plates 24 that are parallel to each other, and a backside plate 26 that is connected to the rear edges of the upper plate 20, the bottom plate 22, and the left and right side plates 24.

The battery storage chambers 12 are interposed between the left and right side plates 24 and between the upper plate 20 and the bottom plate 22 and are aligned in the horizontal direction.

As shown in FIGS. 5 and 6, each of the battery storage chambers 12 is defined by an upper wall 28 that is provided below the upper plate 20 and that partitions the upper area of the battery storage chamber 12, a bottom wall 30 that is provided above the bottom plate 22 and that partitions the lower area of the battery storage chamber 12, side walls 32 (refer to FIGS. 2, 4, and 7) that extend from the upper wall 28 to the bottom wall 30 and that partition the sides of adjacent battery storage chambers 12, and a rear wall 34 that is provided in front of the backside plate 26 and partitions the rear area of the battery storage chamber 12.

Each of the openings 16 is defined by the upper wall 28, the bottom wall 30, and the side walls 32.

As shown in FIG. 7, according to this embodiment, the housing 14 includes a lower member 36, a first intermediate member 38 disposed on the lower member 36, a second intermediate member 40 disposed on the first intermediate member 38, an upper member 42 disposed on the second intermediate member 40, and a plurality of partition walls 44 extending from the first intermediate member 38 to the second intermediate member 40.

The lower member 36 includes a bottom portion 36A constituting the bottom plate 22, a front portion 36B being vertically disposed at the front edge of the bottom portion 36A and having a plurality of openings 16, a back portion 36C constituting the backside plate 26, and left and right side portions 36D being vertically provided at the left and right edges of the bottom portion 36A.

Air inlets 46 provided as slits and a circular air outlet 48 are formed in the backside plate 26.

As shown in FIG. 7, the first intermediate member 38 includes a plate 38A constituting the bottom wall 30 of each of the battery storage chambers 12 and side plates 38B formed by bending downward the left and right edge areas of the plate 38A.

The first intermediate member 38 is attached to the lower member 36 by fitting the left and right side plates 38B to the inner sides of the side portions 36D or by fitting the left and right side plates 38B to the outer sides of the side portions 36D.

The charger-side terminals 18 are disposed at the rear edge of the bottom wall 30. The charger-side terminals 18 may be provided on the rear wall 34.

The second intermediate member 40 includes a plate 40A constituting the upper wall 28 of each battery storage chamber 12, side plates 40B formed by bending downward the left and right edge areas of the plate 40A, and a back plate 40C connecting the rear edge of the plate 40A and the rear edges of the side plates 40B and constituting the rear wall 34, as shown in FIG. 8.

Connecting parts 50 are formed as slits in the upper section of the rear wall 34.

The second intermediate member 40 is attached to the first intermediate member 38 by fitting the left and right side plates 40B to the outer sides of the side plates 38B, by fitting the left and right side plates 40B to inner sides of the side plates 38B, or by fitting the side plates 40B to the outer sides of the side plates 38B of the first intermediate member 38 that are fit to the outer sides of the side portions 36D of the lower member 36.

As shown in FIG. 7, the partition walls 44 extend from the plate 38A of the first intermediate member 38 to the plate 40A of the second intermediate member 40 and constitute the side walls 32 partitioning the sides of adjacent battery storage chambers 12.

The upper member 42 includes a plate 42A being disposed above the plate 40A of the second intermediate member 40 and constituting the upper plate 20 and side plates 42B being formed by bending downward the left and right edge areas of the plate 42A and constituting the left and right side plates 24.

The upper member 42 is attached to lower member 36 by fitting the left and right side plates 42B to the outer sides of the side portions 36D or by fitting the side plates 42B to the outer sides of the side plates 40B of the second intermediate member 40 that are fit to the outer sides of the side portions 36D of the lower member 36.

As shown in FIG. 2, a space S is defined by the upper plate 20, the bottom plate 22, the rear wall 34, and the backside plate 26.

The space S communicates with the battery storage chambers 12 through the connecting parts 50.

As shown in FIGS. 5 and 6, electronic parts 52 connected to the charger-side terminals 18 so as to constitute a charging circuit are disposed in the space S. According to this embodiment, the charging circuit is formed by mounting the electronic parts 52 on a printed circuit board disposed on the bottom plate 22. The charging circuit includes a power source unit that generates a charging voltage (charging current) to be supplied to the batteries 2 on the basis of a commercial power source supplied via a power cable (not shown) connected to an electrical outlet and a charging control unit that controls the supply of the charging voltage (charging current) to the batteries 2. The charging control unit, for example, turns on charging display lamps provided in the vicinity of the openings 16 of the battery storage chambers 12 during charging and turns off the charging display lamps when charging is complete.

As shown in FIG. 5, a fan 56 is provided in the air outlet 48. As shown by an arrow in FIG. 3, by driving the fan 56, outside air is introduced into the batteries 2 from the air inlets 46, and air in the battery storage chambers 12 is introduced into the space S through the connecting parts 50. The air introduced into the space S cools the electronic parts 52 and, then, is discharged outside the space S through the air outlet 48.

FIGS. 5 and 6 illustrate an attaching and detaching mechanism 58 that prevents the battery 2 from moving in the direction of the opening 16 while the battery 2 is stored in the battery storage chamber 12 and while the battery-side terminal 4 and the charger-side terminal 18 are connected. The attaching and detaching mechanism 58 also disconnects the battery-side terminal 4 and the charger-side terminal 18 and ejects the battery 2 from the second end in the depth direction through the opening 16. FIGS. 5 and 6 also illustrate a push-operation member 60 provided at the opening 16. The charger according to this embodiment of the present invention includes the housing 14 accommodating a plurality of battery storage chambers 12. For the above-described attaching and detaching mechanism, various known structures may be employed. Furthermore, chargers that do not include an attaching and detaching mechanism may also be included in the scope of the present invention.

Next, the usage of the charger 10 will be described.

To charge the battery 2, the battery 2 to be charged is inserted into the opening 16 from the first ends in the depth direction provided with the battery-side terminal 4; then the battery 2 is pushed farther into the battery storage chamber 12; and finally the battery-side terminal 4 is connected with the charger-side terminals 18.

When an electrical connection between the charger-side terminals 18 and the battery-side terminal 4 is detected, the charging control unit turns on the charging display lamp and starts supplying a charging voltage (charging current) to the battery 2. When charging is complete (i.e., at full charge), the supply of the charging voltage (charging current) to the battery 2 is stopped and the charging display lamp is turned off.

After the charging display lamp is turned off, the battery is pulled out from the battery storage chamber 12.

With the charger 10 according to this embodiment of the present invention, since a plurality of the battery storage chambers 12 are provided parallel to each other so that the depth direction of the battery storage chambers 12 matches the horizontal direction and the openings 16 are formed at the second end of the battery storage chambers 12 in the depth direction, a plurality of large-capacity batteries 2 for broadcasting equipment can be aligned in a small space and be charged, and the attachment and detachment operation of the batteries 2 can be carried out efficiently.

Figure 9:
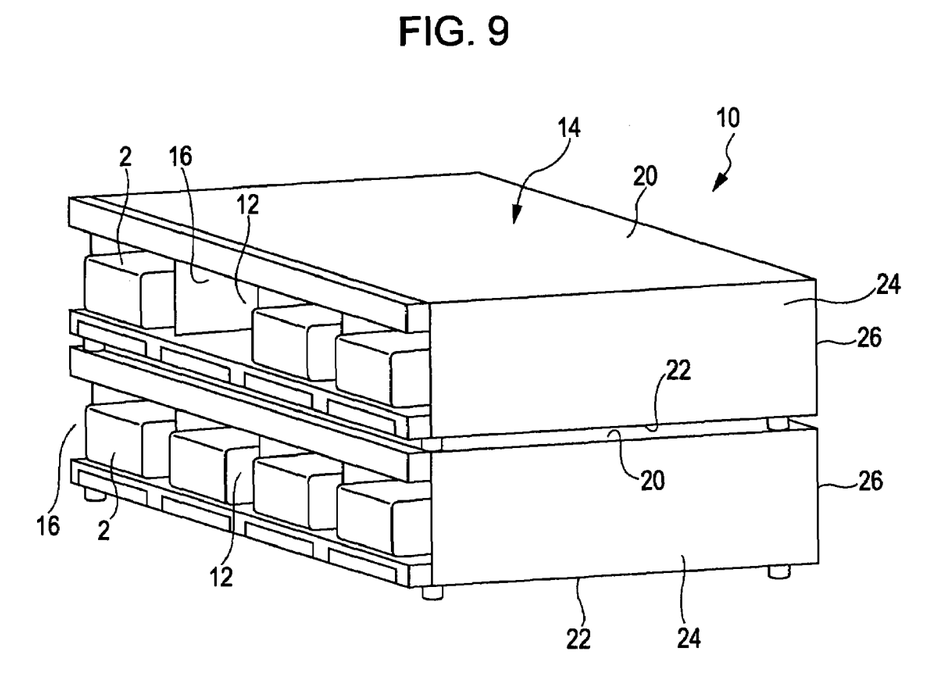
FIG. 9 is a perspective view illustrating a plurality of stacked chargers.

Since the battery storage chambers 12 are disposed so that the depth direction of the battery storage chambers 12 matches the horizontal direction and the openings 16 are formed along a straight line in plan view of the housing 14, as shown in FIG. 9, a plurality of chargers 10 can be stacked on each other by mounting a first charger 10 on a mounting surface on a desk or a shelf and then mounting a second charger 10 on the upper plate 20 of the first charger 10 in a manner such that the openings 16 of the first and second chargers 10 face the same direction.

By stacking the chargers 10 on each other in this way, a plurality of batteries 2 can be charged without occupying a large area on a mounting surface.

Thus, this is advantageous when charging many large-capacity batteries for broadcasting equipment in that the plurality of large-capacity batteries can be charged in a small space outdoors or while traveling, such as at a hotel room or in an outdoor broadcasting van.

Figure 10:
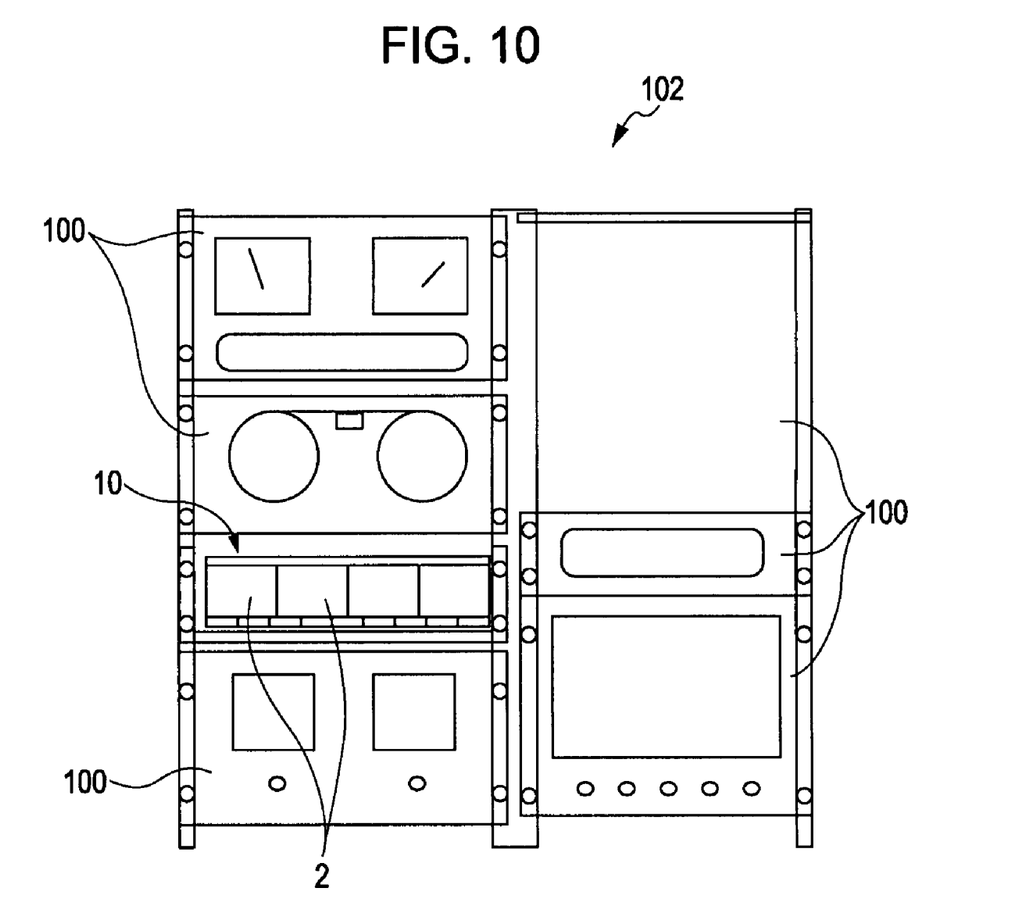
FIG. 10 illustrates the charger stored in a rack.

As shown in FIG. 10, broadcasting equipment 100 installed in a broadcasting station or an outdoor broadcasting van is often stored in a standard rack for broadcasting equipment.

This standard rack for broadcasting equipment includes a accommodation space (shelf) configured to accommodate the broadcasting equipment 100 that has a standardized width in the horizontal direction of, for example, 19 inches. The width of the broadcasting equipment 100 is set so that the broadcasting equipment 100 can be stored in 19-inch rack 102, which is one type of such a standard rack for broadcasting equipment.

Therefore, by setting the width of the housing 14 of the charger 10 to 19 inches so as to match the 19-inch rack 102, the charger 10 can be easily stored in the 19-inch rack 102. Moreover, the chargers 10 can be stacked on each other and stored in the 19-inch rack 102. The plurality of large-capacity batteries 2 for broadcasting equipment can be aligned and charged in a small space in an outdoor broadcasting van and so on. Therefore, this is particularly advantageous when charging the batteries 2 outdoors or while traveling, such as at a hotel room or in an outdoor broadcasting van.

The space S is provided adjacent to the battery storage chambers 12 in the housing 14, and the electronic parts 52 constituting a charging circuit are disposed in the space S.

By disposing the charging circuit for charging the batteries 2 mostly inside the space S, the size of the housing 14 can be reduced. In other words, this is advantageous in reducing the size of the charger 10.

Furthermore, by disposing the charging circuit for charging the batteries 2 mostly inside the space S, only one of each of an electricity-receiving connector and a power cable are required. This is advantageous in aligning many batteries 2 for charging in a small space.

The space S is provided adjacent to the battery storage chambers 12 in the housing 14. The electronic parts 52 constituting the charging circuit are disposed in the space S. The space S is cooled through the air inlets 46, the air outlet 48, and the fan 56.

Therefore, although heat is generated at the electronic parts 52 constituting the charging circuit when charging is carried out, the electronic parts 52 are cooled by outside air introduced through the air inlets 46 and air inside the battery storage chambers 12 introduced through the connecting parts 50. This is advantageous in protecting the electronic parts 52.

The space S where the electronic parts 52 are disposed is defined by the upper plate 20, the bottom plate 22, the rear wall 34, and the backside plate 26 and is separated from the battery storage chambers 12. Therefore, heat generated at the electronic parts 52 can be prevented from being transmitted to the batteries 2 in the battery storage chambers 12. This is advantageous in protecting the batteries 2.

Furthermore, although heat is generated at the batteries 2 when carrying out charging, the batteries 2 can be cooled because air flows from the openings 16 to the connecting parts 50. This is advantageous in protecting the batteries 2.

According to the above-described embodiment, the battery storage chambers 12 are aligned in the horizontal direction. However, instead, the battery storage chambers 12 may be aligned in the vertical direction.

According to this embodiment, each of the batteries 2 is shaped as a rectangular column whose depth is greater than its width and height. However, the shape of the battery is not limited thereto. The shape of the battery storage chambers is determined on the basis of the shape of the battery. The scope of the present invention includes a case in which the battery has a depth smaller than its width or height.

It should be understood by those skilled in the art that various modifications, combinations, sub-combinations and alterations may occur depending on design requirements and other factors insofar as they are within the scope of the appended claims or the equivalents thereof.

What is claimed is:

1. A portable charger configured to charge batteries, the charger comprising:
    a housing including a plurality of battery storage chambers accommodating the batteries, the battery storage chambers being aligned in a horizontal direction such that depth directions of the battery storage chambers are parallel to each other;
    openings formed on first ends of the battery chambers in the depth direction, the batteries being attached to the battery storage chamber through the openings when the batteries are to be charged and the batteries are detached from the battery storage chambers through the openings when charging is completed; and
    charger-side terminals provided on the battery storage chambers, the charger-side terminals being connect to and disconnect from battery-side terminals of the batteries stored in the battery storage chambers.

2. The charger according to claim 1, wherein the plurality of battery storage chambers are aligned in the horizontal direction and the plurality of openings are aligned along a straight line in plan view of the housing.

3. The charger according to claim 1,
    wherein the plurality of battery storage chambers are aligned in the horizontal direction and the plurality of openings are aligned along a straight line in plan view of the housing,
    wherein the housing is shaped as a rectangle in plan view, and
    wherein the openings are aligned along one of the longer sides of the rectangle.

4. The charger according to claim 1,
    wherein the housing includes an upper plate and a bottom plate parallel to each other, left and right side plates parallel to each other, and a backside plate connected to the rear edges of the upper plate, the bottom plate, and the left and right side plates, and
    wherein the battery storage chambers are aligned in the horizontal direction between the left and right side plates and between the upper plate and the bottom plate.

5. The charger according to claim 1,
    wherein the housing includes an upper plate and a bottom plate parallel to each other, left and right side plates parallel to each other, and a backside plate connected to the rear edges of the upper plate, the bottom plate, and the left and right side plates, and
    wherein the battery storage chambers are aligned in the horizontal direction between the left and right side plates and between the upper plate and the bottom plate,
    wherein each of the battery storage chambers is defined by an upper wall being provided below the upper plate and partitioning the upper area of the battery storage chambers, a bottom wall being provided above the bottom plate and partitioning the lower area of the battery storage chambers, side walls extending from the upper wall to the bottom wall and partitioning the sides of adjacent battery storage chambers, and a rear wall being provided in front of the backside plate and partitioning the rear area of the battery storage chambers, and
    wherein the openings are each defined by the front edges of the upper wall, the bottom wall, and the side walls.

6. The charger according to claim 5, wherein the charger-side terminals are provided at the rear edge of the bottom wall or the lower edge of the rear wall.

7. The charger according to claim 1,
    wherein the housing includes an upper plate and a bottom plate parallel to each other, left and right side plates parallel to each other, and a backside plate connected to the rear edges of the upper plate, the bottom plate, and the left and right side plates, and
    wherein the battery storage chambers are aligned in the horizontal direction between the left and right side plates and between the upper plate and the bottom plate,
    wherein each of the battery storage chambers is defined by an upper wall being provided below the upper plate and partitioning the upper area of the battery storage chambers, a bottom wall being provided above the bottom plate and partitioning the lower area of the battery storage chambers, side walls extending from the upper wall to the bottom wall and partitioning the sides of adjacent battery storage chambers, and a rear wall being provided in front of the backside plate and partitioning the rear area of the battery storage chambers, and
    wherein electronic parts being connected to the charger-side terminals and constituting a charging circuit are disposed in a space defined by the upper plate, the bottom plate, the rear wall, and the back plate.

8. The charger according to claim 7, further comprising:
    an air inlet formed in the back plate;
    an air outlet formed in the back plate; and
    a fan provided on the back plate,
    wherein outside air is introduced into the space through the air inlet by driving the fan, and
    wherein the outside air is discharged outside the space from the air outlet after cooling the electronic parts.

9. The charger according to claim 7, further comprising:
    an air inlet formed in the back plate;
    an air outlet formed in the back plate; and
    a fan provided on the back plate; and
    connecting parts configured to connect the battery storage chambers and the space, the connecting parts being provided on the rear wall,
    wherein outside air is introduced into the space through the air inlet by driving the fan, and
    wherein the outside air is discharged outside the space from the air outlet after cooling the electronic parts.

10. The charger according to claim 1,
    wherein the battery terminals are provided at first ends of the batteries in the depth direction,
    wherein charger-side terminals are provided at second ends of the battery storage chambers in the depth direction,
    wherein second ends of the batteries in the depth direction are disposed in the vicinity of the openings when the batteries are stored in the battery storage chambers and the battery terminals and when the charger-side terminals are connected.

11. The charger according to claim 1, wherein the battery storage chamber accommodates a large-capacity battery for broadcasting equipment, the battery being attached to and detached from the broadcasting equipment.

12. The charger according to claim 1,
wherein the battery storage chambers accommodate large-capacity batteries installed in broadcasting equipment, and
wherein the housing has external size allowing the housing to be stored in a storage space of a standardized rack for broadcasting equipment.

13. The charger according to claim 12,
wherein the standardized rack for broadcasting equipment is a 19-inch rack, and
wherein the horizontal external width of the housing is 19 inches.

14. The charger according to claim 1, wherein the depth of each of the battery storage chambers is greater than either the width or the height of each of the battery storage chambers.

* * * * *